June 16, 1936.　　　　　E. BLETZ　　　　　2,044,147

REMOTE CONTROL THERMOSTAT

Filed June 27, 1934

WITNESSES:
E. A. McCloskey
H. M. Biebel

INVENTOR
Edward Bletz.
BY
W. R. Coley
ATTORNEY

Patented June 16, 1936

2,044,147

UNITED STATES PATENT OFFICE 2,044,147

REMOTE CONTROL THERMOSTAT

Edward Bletz, Lexington, Ohio, assignor to Westinghouse Electric & Manufacturing Company, East Pittsburgh, Pa., a corporation of Pennsylvania Application June 27, 1934, Serial No. 732,699

6 Claims. (Cl. 200—122)

My invention relates to electric heating devices and particularly to temperature control systems for such devices.

An object of my invention is to provide a relatively simple, remotely located, thermally-actuable circuit controller for an electrical device.

Another object of my invention is to provide a relatively simple, thermally-actuable circuit controller of the intermittent or on-and-off type that shall be provided with manually-actuable means to vary the relative proportions of the on and off periods of time.

Another object of my invention is to provide a thermally-actuable circuit controller that shall permit of moving it to its closed or to its open position irrespective of the thermal condition of the circuit controller.

A still further object of my invention is to provide a thermally-actuable circuit controller that shall embody means to cause the first closed-circuit period to be longer than similar succeeding periods with the same setting of the switch or controller.

Other objects will either be apparent from the accompanying description of one form of device and system embodying my invention or will be pointed out in the course of the following description thereof.

In practicing my invention, I provide a snap acting bi-metal circuit-controlling dished disk which may either carry contact members thereon or may directly engage fixed contact members mounted on a base, in such manner as to be adjustable relatively thereto, stop pins being provided on the base and extending through the disk to limit the dishing of the disk when in its open position. A heating element of relatively small heating capacity is supported on the base in heat transmitting relation to the bimetal disk and is connected in series circuit relation relatively to the electric device which it is to control.

Figure 1:
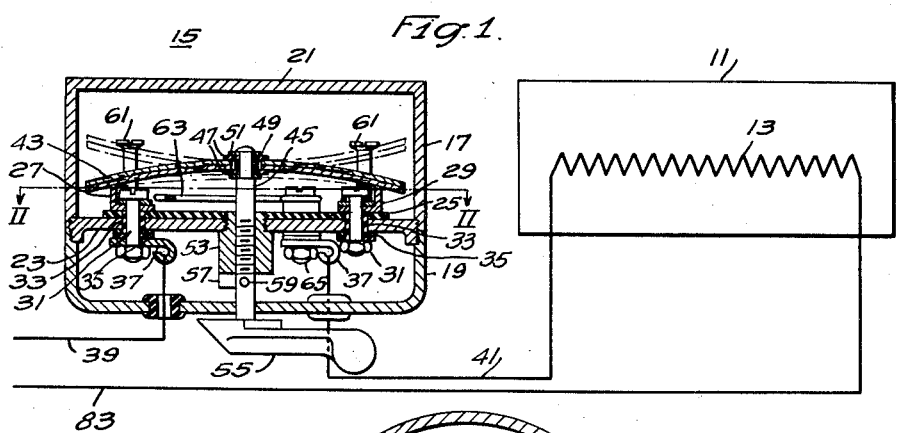
Figure 2:
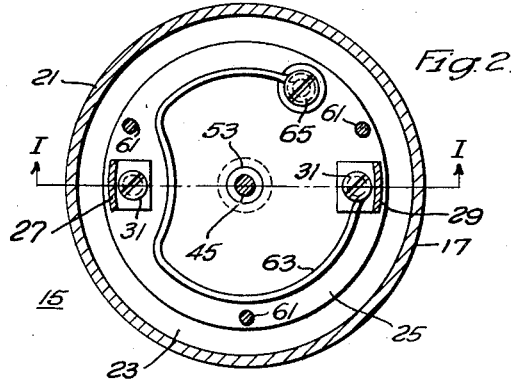
Figure 3:
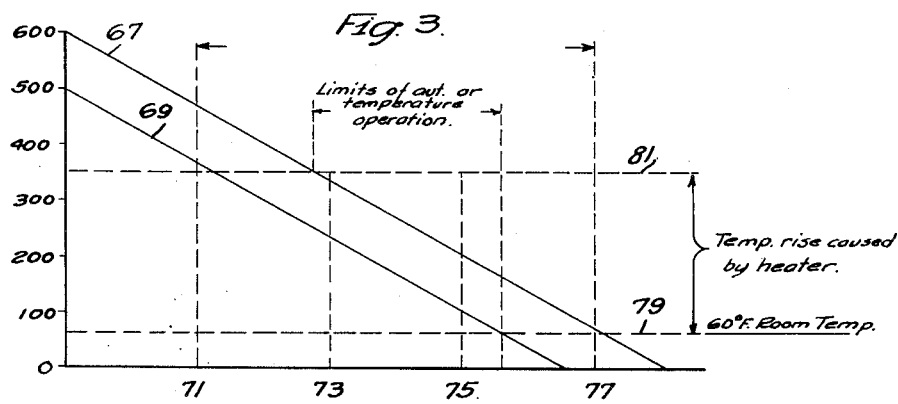

In the single sheet of drawings:

Figure 1 is a view showing a device embodying my invention in lateral section, and as associated with an electrically heated device, the thermal switch being shown in section taken on the line I—I of Fig. 2, Fig. 2 is a sectional view taken on the line II—II of Fig. 1 of the thermal switch, and Fig. 3 is a diagram showing the operation of the device.

As has been stated hereinbefore, the thermal circuit controller particularly embodying my invention is useful in controlling the heating element of an electric device while out of direct thermal relation with the device or the heating element. It is particularly useful in controlling the circuit intermittently, that is, in being used as a timer, the on and off periods of time being adjustable relatively to each other by manually-actuable means associated with the thermal switch or controller.

Referring to the drawing, an electric appliance 11 is indicated generally only and is illustrated as having an electric heating element 13 operatively associated therewith. By the showing of elements 11 and 13, I desire to illustrate any kind of electric device having an element whose circuit is to be controlled irrespective of its design or application.

A thermal circuit controller 15 is located out of direct thermal control of the heating element 13 or more generally stated, out of direct thermal control of appliance 11. Device 15 may include a casing 17 which may be made either of metal or of electric insulating material and which may include an annular member as well as a shallow dished member 19 and a cover member 21. I do not desire, however, to be limited to the use of members 17 and 19 to constitute a casing of substantially cup shape, the open end of which is closed by cover 21, as any other equivalent construction may be used. A flat base 23 may be located within the members 17 and 19 and may have screw-threaded engagement therewith as is shown more particularly in Fig. 1 of the drawing. On this base, I locate a sheet or disk 25 of electric-insulating material such as mica. A pair of contact members 27 and 29, each of substantially L-shape, have one part thereof engaging the outer face of disk 25 and are held on the base 23 by machine screws or bolts 31, tubular members 33 of electric insulating material and washers 35 of electric insulating material being provided to thoroughly insulate the bolts 31 from the base 23, it being understood, of course, that suitable openings are provided in the base through which the bolts 31 may extend. Terminal members 37 are provided on that side of base 23 and insulated therefrom as hereinbefore described, opposite the disk 25 to permit of circuit leads 39 and 41 being connected thereto. The contact members 27 and 29 are spaced diametrically from each other as is shown more particularly in Fig. 2 of the drawing. I may, however, use a slightly modified form of construction, effective for the same purpose.

A bimetallic initially dished disk 43 is provided and is preferably of the kind disclosed and claimed in Patent No. 1,448,240, issued to J. A.

Spencer. Briefly, this disk is made of initially flat bimetal and is then dished to a predetermined relatively high degree so that its normal temperature differential of operation is very large.

I here wish to define what is meant by the statement made in the previous paragraph as to the temperature differential of operation being very large. It is well known that a bimetal strip or bar has a very small temperature differential of operation, that is, a contact member located on the free or movable end of a bimetal bar fixedly supported at its other end, will engage a fixed contact member at a predetermined temperature and will be disengaged therefrom at a different temperature, the difference between the two temperature values being relatively very small. In some cases, this small temperature differential of operation may be on the order of 1° or even as small as $\frac{1}{10}$°. In contradistinction to this, I so design and make the disk 43 that it will have a very large temperature differential of operation when it is in its initial or normal free and unrestrained condition, this condition being that where it is supported centrally thereof, for instance, on a suitable stud and is free to move in accordance with temperature changes. I have found it possible by suitable methods of manufacture to obtain a disk which will have a temperature differential of operation of 600° F. or even somewhat higher. If it is supported from its central portion and heated, the high expansion component thereof being on the concave side of the disk, it will not move to its oppositely dished position until a temperature of 600° F. or over has been reached. If now the temperature to which the disk is subjected is reduced, it is necessary to reduce the temperature value to zero degrees or even less to cause it to return to its initial position.

When using a disk having such a large temperature differential, I greatly reduce the differential, as will be hereinafter more particularly pointed out, and the means for doing this will now be described. The disk 43 is supported centrally thereof by a stud 45 having one end portion of a reduced diameter as is shown more particularly in Fig. 1 of the drawing, disks 47 of electric insulating material being provided at each side of the disk as well as a short tubular member 49 also of electric insulating material, together with small metal washers 51 to electrically insulate stud 45 from disk 43, since the latter in this particular embodiment of thermal switch is traversed by the current of the circuit which it controls. The base 23 is provided with a relatively heavy lug 53 having an opening therethrough which is internally screw threaded to cooperate with external screw threads on stud 45 which stud can be turned manually by a handle 55 on the other end thereof outside of portion 19 of the casing, for a purpose to be hereinafter described. Member 53 is provided with a stop lug portion 57 cooperating with a small pin 59 in stud 45 to limit the angular turning movement of stud 45. It is obvious that the position of the central part of disk 43 can be varied relatively to the base by suitable adjustment of the stud 45 relatively to its supporting member 53 at the time of assembly of device 15.

As has already been stated, the free or initial temperature differential of operation of the disk 43 is very large, which means that the amount of dishing thereof or, to state it differently, the depth of the dish given the disk is very large, and one method of reducing the high temperature or that temperature at which the disk will snap from its closed position to its open position is to reduce this initial dish which may be done by flattening the disk as by initial turning movement of stud 45 in such direction as to flatten the disk and to cause an increase in the contact pressure between the disk 43 and the fixed contact members 27 and 29.

As it is desired to also increase the low temperature or that temperature at which the disk snaps from its open position to its closed position, I provide a plurality of stop pins 61, here shown as three in number, which extend into the base 23 and may be screwed into the same to a greater or a lesser extent until the desired temperature differential between the on and the off positions is obtained. This temperature differential is, of course, measured in degrees of temperature.

I further provide a small auxiliary heating element 63 which is supported between the disk 43 and disk 25 of electric-insulating material, as by being supported at its ends on contact member 29 or, more particularly, under the head of stud 31 associated with contact member 29 and with a terminal stud 65 operatively associated with the second terminal 37. The arrangement is such that the current traversing the circuit to be controlled by the thermal switch, which in this case includes a heating element 13, also 30 traverses auxiliary heating element 63, the heat from which will be radiated against the inner side of bimetal disk 43.

Referring now to Fig. 3 of the drawing, I have there illustrated diagrammatically the operation of the thermally actuable switch or circuit controller 15.

As has been stated hereinbefore, the temperature differential of operation of the disk 43 has been greatly reduced and for illustrative purposes, I have illustrated a temperature differential on the order of 100° F. Line 67, extending angularly relatively to the axes of both the ordinates and abscissæ, indicates the temperature values at which the disk will snap from its closed to its open position, the actual temperature value at which it will so operate being determined by the turning movement of handle 55. Line 69 indicates the corresponding on or closing values of temperature. The points 71, 73, 75, and 77 are illustrative of four different positions of the disk as determined by four different angular positions of adjusting arm 55. It will be noted that when the disk is in position 71, the off temperature or the temperature at which it will open, is about 500° while the temperature at which it will close is about 400° F. When it has been moved to position 77, its opening temperature is on the order of 70° F. while its on or closing temperature is approximately minus 30° F. It is thus possible to greatly vary the values of the on and off temperature at which the disk will move from one of its limiting positions to its other limiting position, and it will be noted further that the temperature differential of operation and the difference of temperature necessary to cause it to move from one position to its other position is substantially constant and on the order of 100°. It is to be noted, however, that this temperature differential can be made any desired value, in the manner hereinbefore set forth as by reducing the amount of dishing of the disk to reduce the high temperature, that is, that temperature value at which it moves to its open position and that the low temperature value can be raised by shortening, so to speak, the studs 61, as by screwing them further into base 23.

Horizontally extending line 79 is drawn to indicate the average room temperature which, for illustrative purposes, has been taken at 60° F. Horizontally extending line 81 has been drawn at a temperature value of 350° F. and indicates that value of temperature above room temperature caused by auxiliary heating element 63. In other words, the amount of heat generated in auxiliary heating element 63 is substantially 290° F.

Let it be assumed first of all that disk 43 has been adjusted to position 71. It will be noted that when heating element 63 is energized as by the normal current traversing the circuit including conductor 39, thermal switch 15, conductor 41, heating element 13 and a return conductor 83, the rise of temperature of disk 43 is well below the temperature necessary to cause automatic operation of the disk 43 from the position shown by the full lines in Fig. 1 of the drawing to the position shown in the broken lines in Fig. 1 of the drawing. The circuit through heating element 13 will, therefore, remain closed continuously.

Referring now to the position indicated by the broken line extending above point 73, it will be noted that the temperature value at which disk 43 can move automatically from its closed to its open position is below that to which it will be subjected by the action of the heat generated in auxiliary heating element 63, so that the disk if set at position 73 can and will open. Let it be assumed that the disk has moved to its open position, the heating element 63 will, of course, be deenergized and the disk 43 will be subjected to a reduction in its temperature and, as soon as the temperature value has reached that value corresponding to the intersection of line 69, and the line above point 73, the disk will move from its open to its closed position. As has already been stated, the temperature differential of operation is on the order of 100° F. and since the excess of temperature of line 81 over that necessary to cause the disk to open (which is indicated by the intersection of line 67 with the line extending vertically upwardly from point 73) is very small, on the order of say 10° F., it is obvious that the length of time during which the circuit will be closed is relatively long as compared to the length of time during which it will remain open. Roughly, the length of time during which the circuit is open will be on the order of $\frac{1}{10}$ of the length of time during which it is closed.

It is, of course, obvious that the length of time during which the switch is closed is constant and is measured in temperature by the vertical distance between lines 69 and 67 or substantially 100° F. At the setting indicated by vertical line 75, the distance between line 67 or more particularly, the intersection of line 67 and the line extending vertically upwardly from point 75, and line 81 is now substantially 150°, and the length of time during which the circuit is open is greatly increased relatively to the length of time during which it is closed. That is, whereas for position 73, the proportional length of time during which the circuit is open is small, the proportional length of time during which the circuit is open for position 75 is quite large.

If the disk is adjusted to position 77, it is obvious that it will remain open, since it has been forced mechanically, so to speak, to a position where it cannot respond to the effect of temperature variations. To put it in other words, when set to position 77 or even further, it will not close and when set to position 71 or further to the left thereof it will not open. If set to a low position, that is to say, to position 75, the length of time during which it is on will be short as compared to the length of time during which the switch is off or open. When set to the high position, the length of time during which the switch is on is relatively long and the length of time during which it is off is relatively short.

It is obvious, therefore, that the proportions of the lengths of time during which the switch is on and off are adjustable so that a variable-proportion intermittent on and off thermally-controlled switch is provided, which switch may be moved manually to either a permanently off or to a permanently on position.

Voltage variations will also be compensated for, to some degree, since the current through the auxiliary heating element varies directly with the current through the main heating element.

It is to be noted further that when leads 39 and 83 are connected for the first time to a source of supply of electric energy, the temperature of the thermal switch 15 is substantially that of the ambient air in which the switch is located, and since the auxiliary heating element 63 must heat up not only the disk 43 but also substantially all of the thermally actuable switch 15, the first on period will be longer than any succeeding period. This operation is a very desirable one when a thermal switch of the kind described in the present application is used to control say a toaster, since the toaster itself has some thermal mass and the first cycle of operation or of energization of heating element 13 should be longer than any succeeding cycle in order to obtain properly prepared toast in the first cycle as well as in any of the succeeding cycles. The device embodying my invention thus provides a thermally actuable controller effective to control an electric circuit with which it is out of thermal engagement, in such manner as to intermittently open and close the circuit, the lengths of time during which the circuit is open being variable or adjustable relatively to the substantially constant length of time during which the circuit is closed. The thermal switch provides further a relatively simple means which is manually actuable to either a permanently open or to a permanently closed condition as may be desired.

Various modifications may be made in the illustrated device embodying my invention without departing from the spirit and scope thereof, and I desire, therefore, that only such limitations shall be placed thereon as are imposed by the prior art or are set forth in the appended claims.

I claim as my invention:

1. In a thermal control system for an electrical device having a heating element, said system comprising a snap-acting thermally-actuable switch disposed to operate to open and closed positions for controlling the energization of the heating element, means for adjusting the temperature differential of operation between the open and the closed positions of the switch, an auxiliary heating element in heat-transferring relation relatively to the thermally-actuable switch and energized concurrently and in accordance with the energization of the first named heating element, and manually operable means operatively associated with the switch to vary the relative proportion of the length of periods when the switch is open and when it is closed.

2. In a thermal control system for an electrical device having a heating element, said system comprising a snap-acting thermally-actuable switch disposed to operate to open and closed positions for controlling the energization of the heating element, means for adjusting the temperature differential of operation between the open and the closed positions of the switch, an auxiliary heating element in heat-transferring relation relatively to the thermally-actuable switch and energized concurrently and in accordance with the energization of the first named heating element to cause opening of the switch and deenergization of the first named heating element, and manual means to effect opening of the switch irrespective of the temperature thereof caused by the auxiliary heating element.

3. In a thermal control system for an electrical device having a heating element, said system including a snap-acting thermally-actuable switch disposed to operate to open and closed positions and having means for adjusting the temperature differential of operation between its open and its closed positions for controlling the energization of the heating element, an auxiliary heating element energized in accordance with the energization of the first-named heating element and located in heat-transferring relation to the thermal switch, and manually-operable means associated with the switch to cause opening and closing movements thereof irrespective of the temperature conditions of the switch.

4. In a temperature control system for an electrical device having a heating element, said system including a thermally-actuable switch controlling the circuit of the heating element and comprising a snap-acting bimetal disk disposed to operate to off and on positions, a support for the disk and means cooperating with the disk to adjust the temperature differential between its off and its on positions, an auxiliary heater energized concurrently and in accordance with the energization of the heating element and located in heat-transferring relation to the snap-acting bimetal disk and capable of heating said disk to a certain temperature, and manual means for moving the disk support to cause opening and closing movements thereof irrespective of the temperature conditions of the disk.

5. In a temperature control system for an electrical device having a heating element, said system including a thermally-actuable switch controlling the circuit of the heating element and comprising a snap-acting bimetal disk disposed to operate to off and on positions, a support for the disk, means cooperating with the disk to adjust the temperature differential between its off and on positions, an auxiliary heater energized concurrently and in accordance with the energization of the heating element and located in heat-transferring relation to the snap-acting bimetal disk and adapted to heat the disk to a certain temperature, and manually-operable means operatively associated with the disk to vary the relative proportion of the length of the periods when the switch is open and when it is closed.

6. In a temperature control system for an electrical device having a heating element, said system including a thermally-actuable switch comprising a snap-acting bimetal disk having a relatively high temperature differential of operation between its off and its on positions, means for adjusting the temperature differential between the off and the on positions of the disk, a heating element for the disk energized concurrently with the main heating element, manually operable means associated with the disk to vary the relative proportion of the length of the on and off periods of the switch, and means operatively associated with the disk and the heating element for the disk to cause the first on period of the switch to be longer than the succeeding similar periods.

EDWARD BLETZ.